(12) United States Patent
McGrail et al.

(10) Patent No.: US 12,429,237 B2
(45) Date of Patent: Sep. 30, 2025

(54) METHOD AND SYSTEM FOR DEHUMIDIFICATION AND ATMOSPHERIC WATER EXTRACTION WITH MINIMAL ENERGY CONSUMPTION

(71) Applicant: Battelle Memorial Institute, Richland, WA (US)

(72) Inventors: Bernard P. McGrail, Pasco, WA (US); Jeromy W. J. Jenks, Hines, OR (US); Radha K. Motkuri, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 18/507,981

(22) Filed: Nov. 13, 2023

(65) Prior Publication Data
US 2024/0183547 A1    Jun. 6, 2024

Related U.S. Application Data

(63) Continuation of application No. 16/993,699, filed on Aug. 14, 2020.
(Continued)

(51) Int. Cl.
F24F 3/14         (2006.01)
F24F 3/153        (2006.01)

(52) U.S. Cl.
CPC .......... F24F 3/1411 (2013.01); F24F 3/153 (2013.01); *F24F 2003/1435* (2013.01); *F24F 2003/1458* (2013.01)

(58) Field of Classification Search
CPC .. F24F 3/1411; F24F 3/153; F24F 2003/1435; F24F 2003/1458;
(Continued)

(56) References Cited

U.S. PATENT DOCUMENTS 4,793,143 A    12/1988 Rhodes
6,199,388 B1   3/2001 Fischer
(Continued)

FOREIGN PATENT DOCUMENTS

CN    103203185         7/2013
CN    209484741 U   *   1/2019    .............. F24F 13/00
(Continued)

OTHER PUBLICATIONS

CN 209484741 U Translation (Year: 2019).*
(Continued)

*Primary Examiner* — Jerry-Daryl Fletcher
*Assistant Examiner* — Dario Antonio Deleon
(74) *Attorney, Agent, or Firm* — Klarquist Sparkman, LLP

(57) ABSTRACT

Methods, systems and devices for managing humidity within an HVAC system including a nanostructured desiccant porous material configured to adsorb water from an inlet stream at a first air pressure and to release water from that material when subjected to a second air pressure when the second air pressure is lower than the first air pressure is located within a particular location so as to allow for the passage of wet air over the materials and allow adsorption of the water on to the material. When coupled with a vacuum pump water can be collected and released from the materials and the system, regenerating the material for future use and removing water from a stream at a significantly lower cost than existing processes.

8 Claims, 9 Drawing Sheets

Related U.S. Application Data

(60) Provisional application No. 62/887,950, filed on Aug. 16, 2019.

(58) Field of Classification Search
CPC ............. F24F 3/1429; F24F 2003/1446; F24F 2003/144; B01D 53/0476; B01D 53/0407; B01D 53/261; B01D 2253/102; B01D 2253/108; B01D 2253/202; B01D 2253/204; B01D 2257/504; B01D 2257/708; B01D 2259/40088; B01D 2259/4508; B01D 2259/65
See application file for complete search history.

(56) References Cited

U.S. PATENT DOCUMENTS

| | | | |
|---|---|---|---|
| 9,146,040 | B2 | 9/2015 | Devalve |
| 10,589,220 | B1* | 3/2020 | DiMaiolo et al. ... B01D 53/047 |
| 2004/0040172 | A1 | 3/2004 | Crawford |
| 2013/0056177 | A1* | 3/2013 | Gerber et al. ........ F24F 12/002 |
| | | | 165/96 |
| 2014/0223947 | A1* | 8/2014 | Ranjan et al. ........ F24F 3/1417 |
| | | | 62/271 |
| 2016/0123610 | A1 | 5/2016 | Uselton |
| 2017/0184319 | A1 | 6/2017 | Vandermeulen et al. |
| 2017/0321909 | A1 | 11/2017 | Davies |
| 2018/0328601 | A1 | 11/2018 | Weickert et al. |
| 2019/0176084 | A1 | 6/2019 | Claridge et al. |
| 2020/0164302 | A1* | 5/2020 | Benedict et al. .. B01D 53/1425 |

FOREIGN PATENT DOCUMENTS

| | | |
|---|---|---|
| CN | 209484741 | 10/2019 |
| CN | 111182964 | 5/2020 |
| JP | S59-086231 | 5/1984 |
| JP | 2005-030754 | 2/2005 |
| JP | 2005030754 A | 2/2005 |
| JP | 2005326122 A | 11/2005 |
| JP | 2009-083851 | 4/2009 |
| JP | 2010121920 A | 6/2010 |
| JP | 4908700 | 4/2012 |
| KR | 10-2020-0009148 | 1/2020 |
| WO | WO 2018/220027 A1 | 12/2018 |

OTHER PUBLICATIONS

Extended European Search Report of European Application No. 20949668.6, dated Sep. 30, 2024, 50 pages.
Office Action received in related Taiwan Application No. 109138390, dated Jul. 14, 2021, 14 pages.
Office Action received in related Taiwan Application No. 109138390 dated Jul. 1, 2022, 7 pages.
International Search Report and Written Opinion received in PCT/US2020/058309, dated Jul. 16, 2011, 11 pages.
International Search Report received in PCT Application No. PCT/US2020/058005, dated Apr. 28, 2021, 4 pages.
Written Opinion received in PCT Application No. PCT/US2020/058005, dated Apr. 28, 2021, 5 pages.
Office Action issued in Japanese Patent Application No. 2023-509696, dated Oct. 29, 2024, 9 pages (English translation only).

* cited by examiner

METHOD AND SYSTEM FOR DEHUMIDIFICATION AND ATMOSPHERIC WATER EXTRACTION WITH MINIMAL ENERGY CONSUMPTION

CLAIM TO PRIORITY

This is a Continuation of U.S. patent application Ser. No. 16/993,699, filed Aug. 14, 2020, which claims the benefit of U.S. Provisional Patent Application No. 62/887,950, filed Aug. 16, 2019, both of which are hereby incorporated by reference.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

BACKGROUND OF THE DISCLOSURE

Humidity control in building air today mostly occurs passively through condensation on the evaporator coils in the HVAC system. Water condensation generates significant amounts of latent heat, which increases the cooling load on the HVAC system and hence increases overall energy use by 30% or more depending on the local environment. Commercially available dehumidifiers are presently too big and expensive for use in the residential market and are rarely used in commercial buildings except where moisture management challenges require. None of these systems provide options for management of CO2 or other gases such as volatile organic compounds (VOCs), that are becoming increasingly problematic as building envelopes become tighter. The present disclosure provides examples and systems that provide paths forward in overcoming these issues and provide advantages not found in the prior art.

Additional advantages and novel features of the present disclosure will be set forth as follows and will be readily apparent from the descriptions and demonstrations set forth herein. Accordingly, the following descriptions of the present disclosure should be seen as illustrative of the disclosure and not as limiting in any way.

SUMMARY

The following description provides examples of methods, systems and devices for managing humidity within an HVAC system, and in particular in doing so in a way that is significantly better and more cost effective than what is currently available. In one application a humidity management system for an HVAC system is described wherein the system includes a nanostructured desiccant porous material configured to adsorb water from an inlet stream at a first air pressure and to release water from that material when subjected to a second air pressure when the second air pressure is lower than the first air pressure. Preferably the nanoporous material is located within a structured material such as a desiccant bed, although other configurations including 3D arrangements including configuration in rods, coatings on fins or other structures are also envisioned in certain applications. Multiple numbers of these structures can be interconnected with or without connection to other features such as heat pipes or seals. A vacuum pump is preferably connected to the system and is adapted to provide suction to the nanostructured porous material sufficient to lower the air pressure and remove water from the nanostructured porous material thus regenerating the adsorption material.

In some embodiments the nanostructured porous material is may be a MOF, Zeolite, Mesoporous silica, Covalent organic framework materials; Porous organic polymers; and Porous carbon. In one set of embodiments, the material was a MOF and more specifically MOF 303, 801, or 841 with MOF 303 or 801 showing the best performance in some circumstances.

In some instances, heat is used to enhance the performance of the materials in the device. Heat can be conveyed to these materials though operatively connected heat pipes or other means which bring heated material from warmer part of the system to the beds or structures to which the desiccant materials are connected or affiliated. In one arrangement, the heat pipes are operatively connected to a set of fins which have the desiccant materials attached thereto. Water in the air passing over the fins then contacts the materials and is adsorbed. Providing pairs or sets of desiccant material containing beds or other structures within an air passage pathway allows for contact between the water containing air and the desiccant material as the air continually dries while moving across the structures. This can allow for serial drying and increased efficiencies. In addition, if structured appropriately positioned the passageways to these structures can be opened and closed so as to allow some passageways to allow for one set to be in a dehumidifying operation while vacuum is applied to another section and water is removed from the system and the adsorbent regenerated.

In use a method for drying water from ambient air is described. In this method an air stream containing water is passed over a nanostructured porous material configured to adsorb water from an inlet stream at a first air pressure and to release water from that material when subjected to a second air pressure wherein the second air pressure is lower than the first air pressure. This collects water onto the nanostructured porous material and reduces the ambient air pressure to release water from the nanostructured porous material and regenerate the nanostructured porous material for additional water capture. The reduction of the ambient pressure may be provided by a vacuum pump. The nanostructured porous materials may be encapsulated in at least two operationally separated beds whereby one bed is positioned to capture water from an air current and the other is positioned to release captured water. If desired a heat transfer material can be provided in operative fluid connection between the first bed and the second bed so that the heat given off from one process is passed on to assist in the other process. In some instances, this heat transfer material may be contained within a conduit or a heat pipe. The result of such an arrangement is to allow for more cost effective heating and cooling by reducing energy demands upon an HVAC system.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

Various advantages and novel features of the present disclosure are described herein and will become further readily apparent to those skilled in this art from the following detailed description. In the preceding and following descriptions, I have shown and described only the preferred embodiment of the disclosure, by way of illustration of the best mode contemplated for carrying out the disclosure. As will be realized, the disclosure is capable of modification in various respects without departing from the disclosure. Accordingly, the drawings and description of the preferred embodiment set forth hereafter are to be regarded as illustrative in nature, and not as restrictive.

DETAILED DESCRIPTION OF EXEMPLARY EMBODIMENTS

Figure 1:
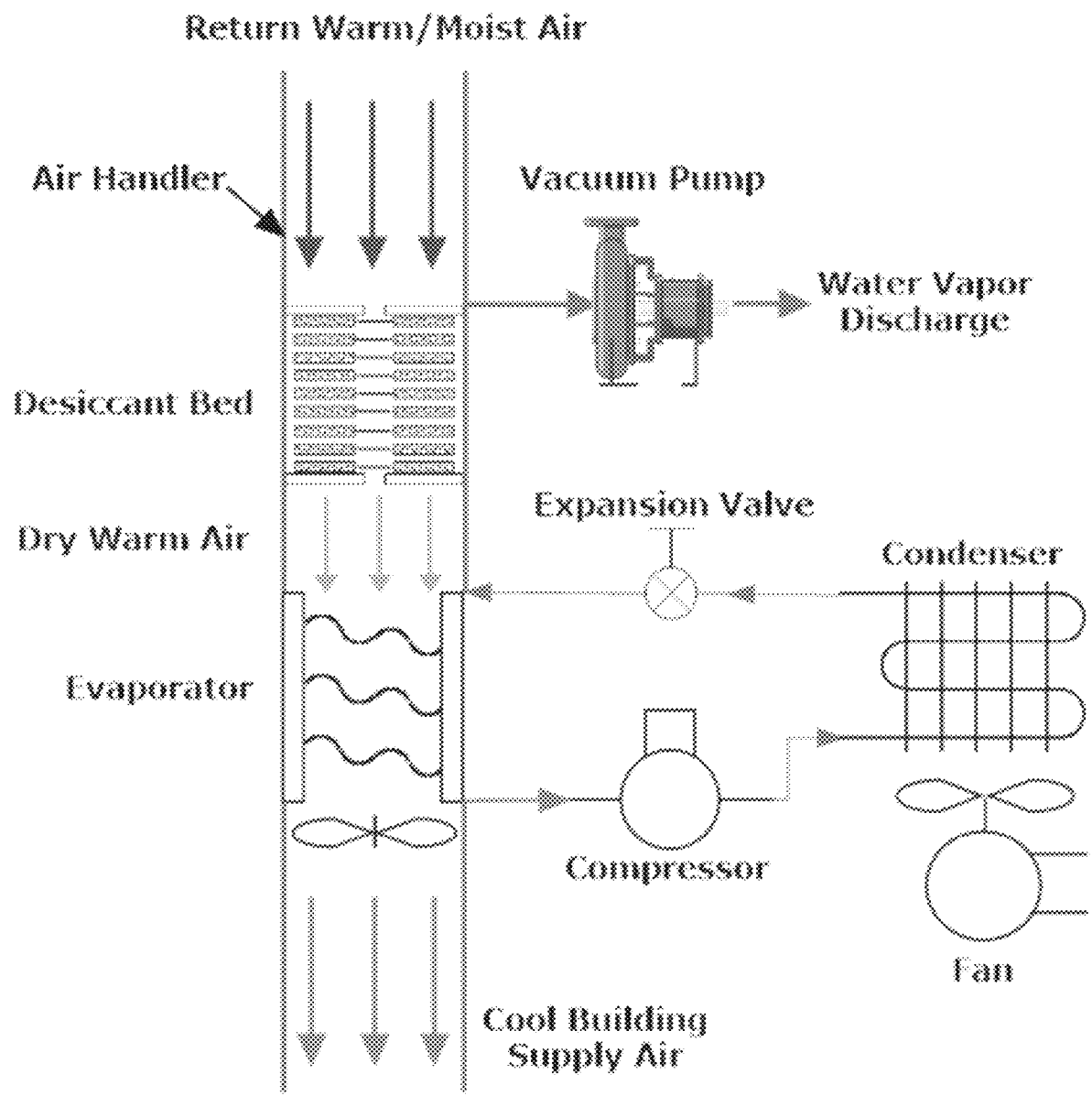
FIG. 1 shows a detailed schematic of one example of embodiment of the invention described in the present description.

The following description includes one example of the present disclosure. It will be clear from this description that the disclosure is not limited to these illustrated embodiments but that the disclosure also includes a variety of modifications and embodiments thereto. Therefore, the present description should be seen as illustrative and not limiting. While the disclosure is susceptible of various modifications and alternative constructions, it should be understood, that there is no intention to limit the disclosure to the specific form disclosed, but, on the contrary, the disclosure is to cover all modifications, alternative constructions, and equivalents falling within the spirit and scope of the disclosure.

In one set of descriptions a novel desiccant system for management of humidity through a building's HVAC system is described wherein new nanostructured porous materials with ultra-high capacity for water are integrated into desiccant beds and thermally coupled to heat pipes. Building air is then passed over these beds to remove water, however instead of using heat for desiccant regeneration the way that commercial dehumidifiers do, these advanced sorbents support facile removal of adsorbed water at room temperature with a simple vacuum pump. The system thus eliminates the additional latent heat cooling load from condensation on the HVAC system evaporator coils. The energy savings obtained more than compensate for the energy required to operate the vacuum pump, and with equipment footprint and capital cost half of today's commercial desiccant dehumidification systems. The system design can also support inclusion of additional sorbent materials in the desiccant bed that permit control of CO2 levels or remove VOCs from building air.

The operating principle is very simple, warm building air is passed over a desiccant bed that removes moisture. The treated air is then passed through an air handler to the evaporator and cooled as in standard HVAC systems. The moisture content of the incoming air however, has been reduced sufficiently so that its dewpoint is below the temperature of evaporator coils thus preventing condensation. Once the desiccant has reached its water uptake capacity, the building air flow is switched to contact a second desiccant bed that has completed its regeneration cycle. The use of new ultra-high water capacity desiccant materials (MOFs and other desiccants) in our system enables a sufficiently compact unit that it can fit within the confines of a standard air handler conduit used in most commercial and residential HVAC installations. This integrated design obviates need for extensive modifications to the building's air handler layout and space for a large dedicated dehumidification system making it ideal for both new installations and retrofits.

Our much simpler approach provides suctions on the desiccant bed during its regeneration cycle with a commercial off-the shelf (COTS) vacuum pump. Desiccant bed temperature is controlled through the use of heat pipes to provide thermal coupling between the desiccant beds. This provides a passive but highly efficient heat transfer mechanism to "cancel" the heat of water vapor adsorption generated in the active desiccant bed during dehumidification with the endothermic heat of desorption consumed in the desiccant bed undergoing regeneration. Hence, the desiccant beds are regenerated isothermally at the building air temperature and do not increase the sensible heat load on the evaporator from desiccant regeneration. Discharged water vapor from the vacuum pump is just exhausted to ambient.

The use of new ultra-high water capacity desiccant materials (MOFs and other desiccants) in our system enables a sufficiently compact unit that it can fit within the confines of a standard air handler conduit used in most commercial and residential HVAC installations. This integrated design obviates need for extensive modifications to the building's air handler layout and space for a large dedicated dehumidification system making it ideal for both new installations and retrofits.

FIGS. 1-9 show various features and sample embodiments. In one example shown in the attached, a configuration is shown wherein the use of new ultra-high water capacity desiccant materials enables a sufficiently compact unit that it can fit within the confines of a standard air handler conduit used in most commercial and residential HVAC installations. This integrated design obviates need for extensive modifications to the building's air handler layout and space for a large dedicated dehumidification system making it ideal for both new installations and retrofits.

Referring now to the figures, FIG. 1, shows a schematic of one embodiment of the invention wherein a desiccant bed containing a desired material, preferably a metal-organic framework materials such as MOF, (and more preferably MOF 303, 842 or 841, although a variety of other materials can also be utilized depending upon the needs and necessities of the user) is operatively positioned to allow moist, typically warm air from a source such as warm air return in a conventional HVAC unit to pass over the desiccant bed, wherein the materials in the desiccant bed adsorb water from the moist air onto the materials and allow drier air to pass on through the desiccant bed. The newly dried air can then be passed on for cooling through the standard parts of a typical HVAC system which can include an evaporator operatively connected to receive a coolant from an expansion valve whereby coolant flows through the evaporator to a compressor which pumps the coolant through a fan cooled condenser coil and back to the expansion valve which controls the passage of coolant back into the evaporator. The now dry and cooled air can then be passed to the desired location. The desiccant bed is also operatively connected to a vacuum pump that provides suction to the materials in the desiccant bed so as to remove water from the desiccant bed and exhausts this water to another location.

The operating principle is very simple. Warm moist building air is passed over a desiccant bed that removes moisture. The now dried air is then passed through an air handler to the evaporator and cooled as in standard HVAC systems. Regeneration of the desiccant takes place as suction pulls water from the desiccant bed materials and exhausts them to a separate location. In a continuously operating system tray of desiccant can be used whereby once the desiccant from a first bed has reached its water uptake capacity, the building air flow is switched to contact a second desiccant bed that has completed its regeneration cycle, this process can be performed alternatingly or serially across a number of beds with each bed being regenerated by vacuum suction while another captures water from a moist, typically warm air source.

A variety of types of materials can be utilized as the desiccant material 22. Previous work on development of various sorbents for advanced cooling systems has established a unique database on water adsorption properties of various nano-porous materials including metal-organic frameworks (MOFs), covalent organic frameworks (COFs), porous organic polymers (POPs), zeolites, mesoporous silica and porous carbons. Our recent work has shown remarkable thermodynamic properties of certain hydrophilic nanoporous materials with large water sorption capacities as well as hydrothermal stabilities established a sufficient and transformational improvement in size, weight, and cost of commercial adsorption chillers (McGRAIL et al., 2014).

In this direction, we revisited the data collected on these hydrophilic materials and developed the materials mainly emphasizing the kinetics of adsorption and precise tuning of their water adsorption properties. The tunability of the materials is advantageous in this application because desorption kinetics must be facile under simple vacuum with no heating. Because of this, we followed two major approaches for the tuning of the desiccant materials by (i) decorating organic linkers with suitably shaped/sized hydrophilic/hydrophobic functional groups and (ii) modifying/adjusting the hydrophilicity of pre-reserved metal-containing cluster nodes with different functional groups. The result was adsorbent materials that show mild hydrophobic character at low RH with a sharp sigmoidal-shaped uptick in water adsorption at RH>20% (Type V isotherm).

Figure 7:
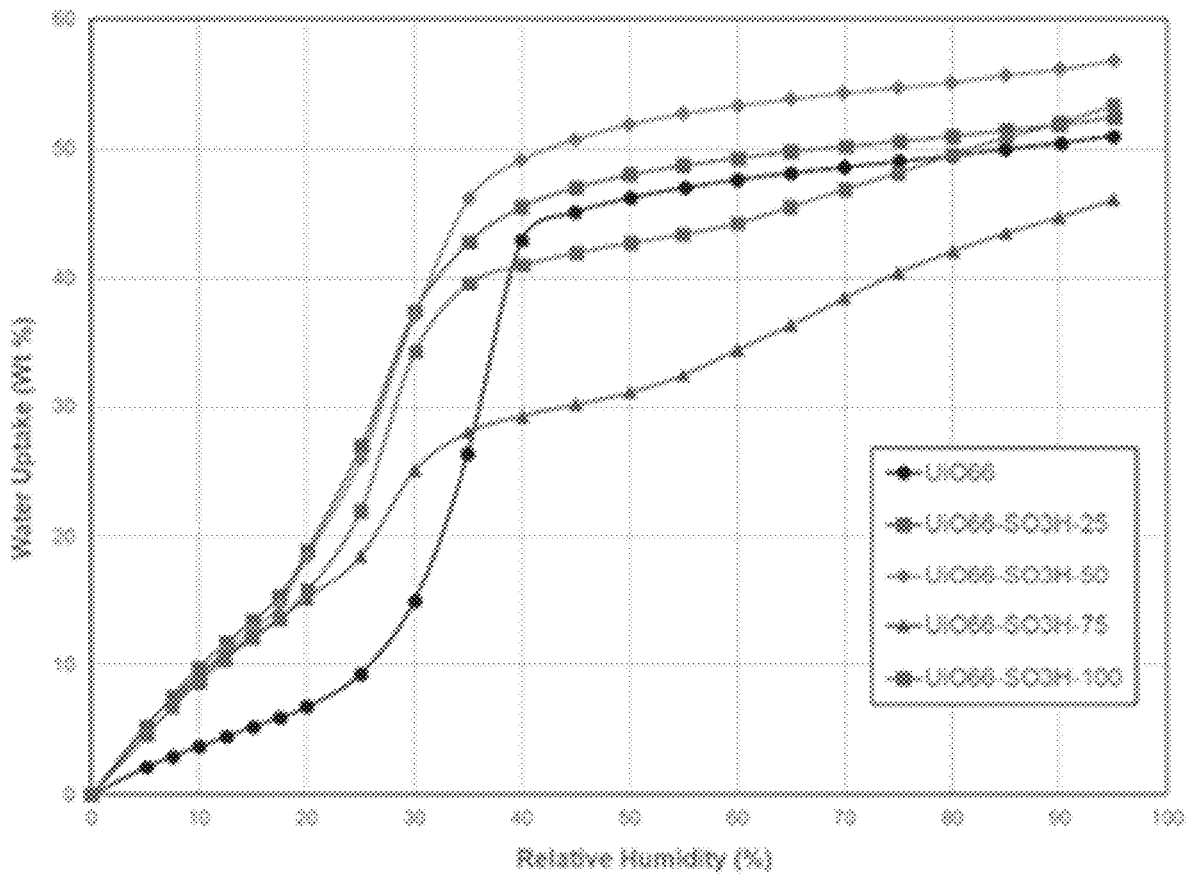
FIG. 7 shows results for enhanced water sorption capacity via SO3H functionalization in UIO-66.

An example of the type of isotherm desired and ability to tune the adsorbent properties via pore-tuning or pore-engineering concepts with $SO_3H$ functionalization on the MOF UIO-66 node that shows water sorption behavior as illustrated in FIG. 7. Varying the concentration of SO3H groups on the node clearly affects its water adsorption properties. Similarly, decorating the cluster with terminal functional groups of different hydrophilicities ($HCCO^-$, $CH3COO^-$, $H2O/OH$, and $PhCOO^-$) resulted in precise control of the water uptake step over a range of RH and is attributed to variances in hydrophobic/hydrophilic pore character associated with differences in pore/cluster/functionality shape and size.

While these examples were deemed workable for one example, in other arrangements materials that have Type V isotherm shoulders in the range of 20-65% RH and with working capacity higher than 50 wt % were selected. In particular, two zirconium-based MOFs, MOF-841, MOF-801 and an aluminum-based MOF-303 were specifically chosen because of their high chemical stability and required water sorption capacities and regenerability shown by cycling tests to ensure there is no degradation of adsorption properties. Furthermore, we expect can be synthesized in commercial quantities using PNNL's atomization-condensation reactor technology (MOTKURI, 2016) or other synthesis method.

MOF-801 and MOF-303 shown to perform the best under the present operating conditions. Since the amount of sorbent required is expected to be in the range of kilogram scale, we were successful in bulk synthesis of MOF-801, prepared/tested in ~100-gram scale already. To prepare these MOFs, 50 mmol of each fumaric acid and ZrOCl2·8H2O were dissolved 500 mL screw-capped jar, in a mixed solvent of DMF and formic acid (200 mL and 70 mL) and was then heated at 130° C. overnight to give a white precipitate. MOF-801. Similarly, MOF-303 was synthesized using 43.1 mmol of 3,5-pyrazoledicarboxylic acid monohydrate dissolved in deionized $H_2O$ (~750 mL) to which a base (NaOH or LiOH solution, ~65 mmol) was added dropwise under vigorous stirring. The resulting mixture was heated for ~60-90 min in a pre-heated oven at 120° C. After cooling to RT, 43.1 mmol of $AlCl_3·6H_2O$ was slowly added to the solution while constant vigorous stirring. Any precipitate formed in the solution was dissolved under extended sonication. The clear solution transferred to autoclave and heated in an oven at 100° C. for 15-24 h to get MOF powder. The obtained MOF powder materials were activated by solvent as well as thermal activation before subjecting to water adsorption. The activated materials were characterized with powder X-ray diffraction (PXRD) for crystallinity, thermogravimetric analysis to understand the stability of the materials and N2 adsorption isotherms for porosity measurements. The well characterized samples were tested their water adsorption measurements at room temperature and then extended to multiple temperatures required for this study.

Once the material characterized, the material scaled-up PNNL's atomization-condensation reactor technology (MOTKURI, 2016) for bulk production. This technology offers a low-cost and scalable route to produce sorbent materials (e.g., MOFs) in bulk quantities. While these particular materials were demonstrated in one application a variety of other materials were also identified for use in such a system. A non-exclusive and not limiting list includes but is not limited to Zeolites such as $AlPO_4$-34, $AlPO_4$-LTA, $AlPO_4$-CHA, 13X, SAPO-34; Mesoporous silica, such as MCM-41, SBA-15; MOFs including Zr and Al based MOFs, MIL family MOFs, Co2Cl2(BTDD); Covalent organic frameworks; Porous organic polymers; Porous carbon.

Figure 6:
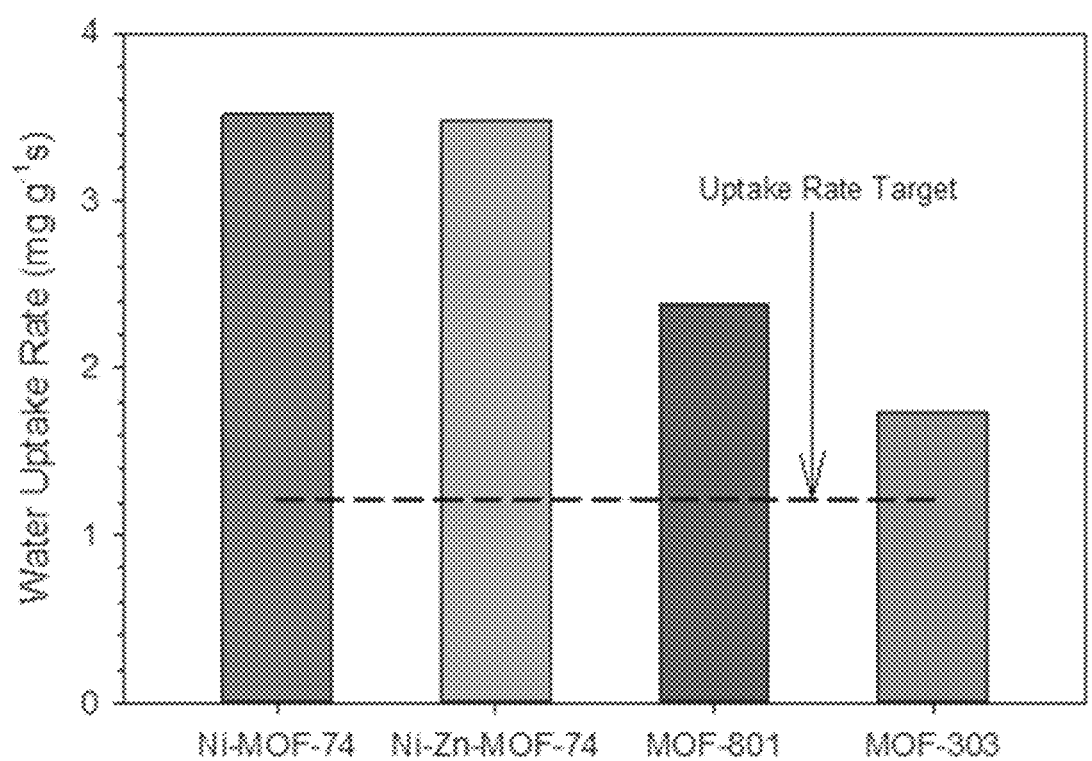
FIG. 6 shows the volumetric water uptake of certain selected nanoporous materials.

FIG. 6 shows the water uptake kinetics for several MOFs. These results show design flexibility in that particle sizes could be reduced from these nominal values to increase the water flux if attaining continuous diffusive transport over these distances proves challenging. Overall, our systems analysis shows that water uptake in the sorbent must reach @ 11 wt % in the targeted 90 s half-cycle. There is solid evidence that this uptake rate is attainable as shown in FIG. 6. The sorbent development team will need to downselect to desiccants that can achieve this uptake rate through a combination of physical properties including specific surface area, particle size, and intra-crystalline water diffusion.

The system design team ensured that water vapor transport to the desiccant surface is sufficient to support the rate of water uptake by the desiccant while minimizing back pressure on the ventilation fan to save energy. Achieving this balance is expected to be most challenging on the adsorption portion of the cycle. Because the vacuum is applied nearly uniformly across the desiccant beds during desorption, water removal rate should be comparatively uniform. Because the desorption rate can be well-controlled by varying the suction pressure, maintenance of an approximate balance between the rate of water adsorption in one chamber and desorption in the other chamber should be readily achievable with adequate sensors monitoring temperature and discharge RH, and feedback through a control system.

The tuning of the desiccant materials by (i) decorating organic linkers with suitably shaped/sized hydrophilic/hydrophobic functional groups and (ii) modifying/adjusting the hydrophilicity of pre-reserved metal-containing cluster nodes with different functional groups enable the desired facile removal under specified conditions. Adsorbents that show mild hydrophobic character at low RH with a sharp sigmoidal-shaped uptick in water adsorption at RH>20% (Type V isotherm). An example of the type of isotherm desired and ability to tune the adsorbent properties via pore-engineering and tuning the adsorbent with SO3H functionalization. (See FIG. 7.) Varying the concentration of SO3H groups on the node clearly affects its water adsorption properties. Similarly, decorating the cluster with terminal functional groups of different hydrophilicities (HCCO—, CH3COO—, H2O/OH, and PhCOO—) resulted in precise control of the water uptake step over a range of RH and is attributed to variances in hydrophobic/hydrophilic pore character associated with differences in pore/cluster/functionality shape and size. Sorbent materials showing promising properties include those that have two or three candidates with optimal Type V isotherm shoulders in the range of 20-65% RH and with working capacity higher than 50 wt %. Preferably desiccant materials that have high chemical stability are utilized to preserve long term performance of the system.

Conventional desiccant-based dehumidifiers (desiccant wheels, desiccant beds) regenerate the desiccant by heating. This severely limits their application because: 1) heat source temperature typically >80° C. is required for desiccant regeneration, 2) heat of adsorption released during dehumidification increases the temperature of the desiccant, thereby reducing its dehumidification capacity, and 3) hot desiccant increases the temperature of the discharge air, which increases cooling load on the evaporator and reduces energy savings.

This much simpler approach enables the desiccant bed to be regenerated with a commercial off-the-shelf (COTS) vacuum pump. Desiccant bed temperature can be controlled through the use of heat pipes to provide thermal coupling between the desiccant beds. This provides a passive but highly efficient heat transfer mechanism to "cancel" the heat of water vapor adsorption generated in the active desiccant bed during dehumidification with the endothermic heat of desorption consumed in the desiccant bed undergoing regeneration. Hence, the desiccant beds are regenerated isothermally at the building air temperature and do not increase the sensible heat load on the evaporator from desiccant regeneration. Discharged water vapor from the vacuum pump is just exhausted to ambient.

In one preferred embodiment, the desiccant beds are thermally coupled with "heat pipes". This provides a passive but highly efficient heat transfer mechanism to "cancel" the heat of water vapor adsorption generated in the active desiccant bed with the endothermic heat of desorption consumed in the desiccant bed undergoing regeneration. This isothermal water extraction cycle (IWEC) allows the dry air stream to cool the condenser unit with a minimal temperature change above ambient temperature. A vacuum pump provides suction on the desiccant bed during its regeneration cycle and is used to provide modest compression to raise the vapor pressure sufficiently to condense to liquid water. Because the compression work is only done on the water vapor, this minimizes the energy consumption. Lastly, the condensate is pumped up to atmospheric pressure for discharge to a storage vessel (this consumes a trivial amount of additional energy).

This innovative AWE system concept eliminates the heat transfer processes in conventional temperature swing designs that produce large exergetic losses. Moreover, it is possible to quite accurately assess the overall energy consumption for this system from the power required for: 1) fan to move air across the desiccant bed and condenser, 2) vacuum pump, and 3) liquid water pump. The air flow (CFM) needed to bring enough air into the system to produce the required amount of water is just given by:

$$CFM = \frac{0.5886 M_w \rho_a}{m_a t_p \varepsilon_R} \quad (1)$$

where $M_w$ is the mass of water the system is to produce over operating time period $t_p$, $\rho_a$ is the air density, and $m_a$ is the mixing ratio (kg-$H_2O$/kg-air) determined from the standard psychrometric properties of moist air. The parameter $\varepsilon_R$ is the efficiency of the overall system in removing water from the air stream and is the key parameter connecting sorbent properties with system performance. The power required for the water pump is trivial compared to these other terms and so will be neglected here. To compute the vacuum pump power, we calculate the compression power required to raise the water vapor pressure from the regenerating desiccant bed to its saturation vapor pressure assuming the condenser unit is operating with a change in temperature 10° C. above the ambient air temperature. We assume the vacuum pump is 80% efficient in the compression work performed on the water vapor. A final assumption is that suction on the desiccant bed is sufficient to remove water from the sorbent when operating just under the condenser pressure, i.e. the compression ratio is fixed and ≤1.2.

Figure 2:
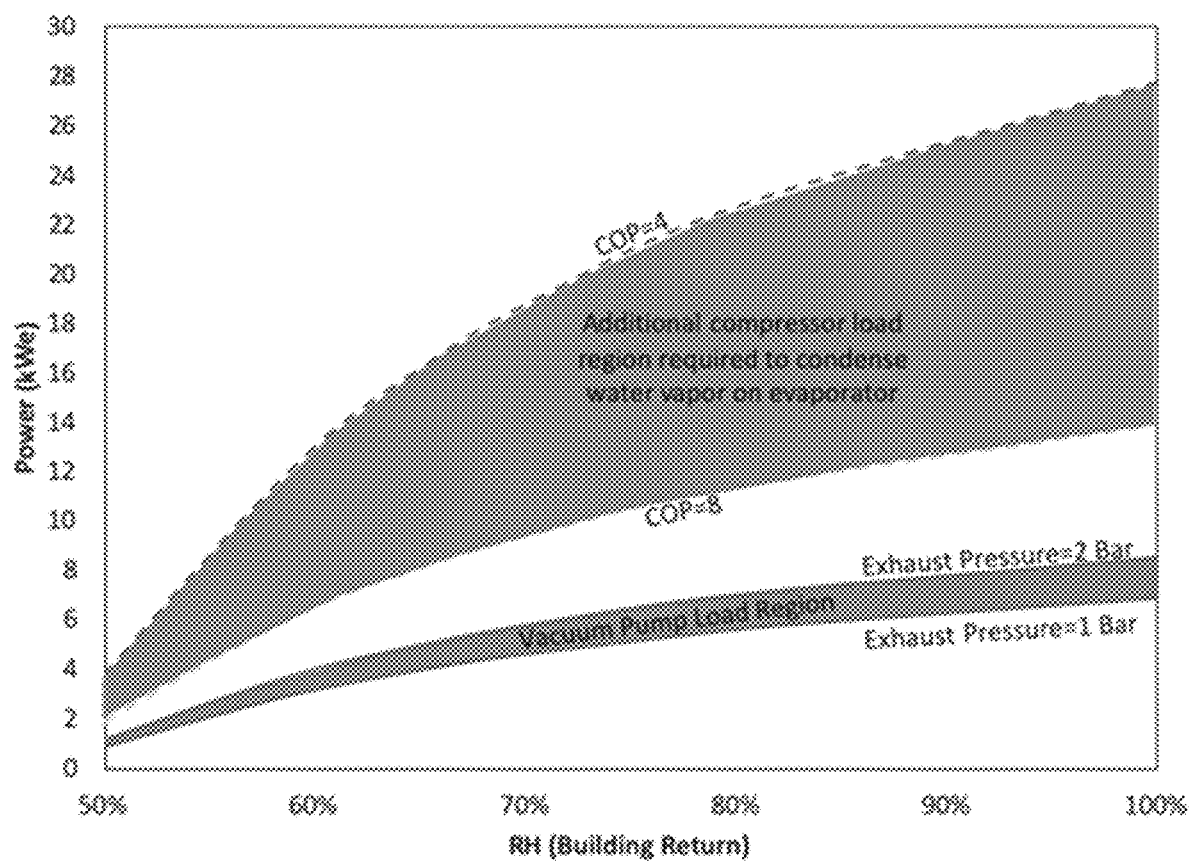
FIG. 2 shows a comparison of the amounts of power used to regenerate the desiccant bed system of the present application compared to the load on the HVAC compressor eliminated as a function of humidity level in the building return air.
Figure 3:
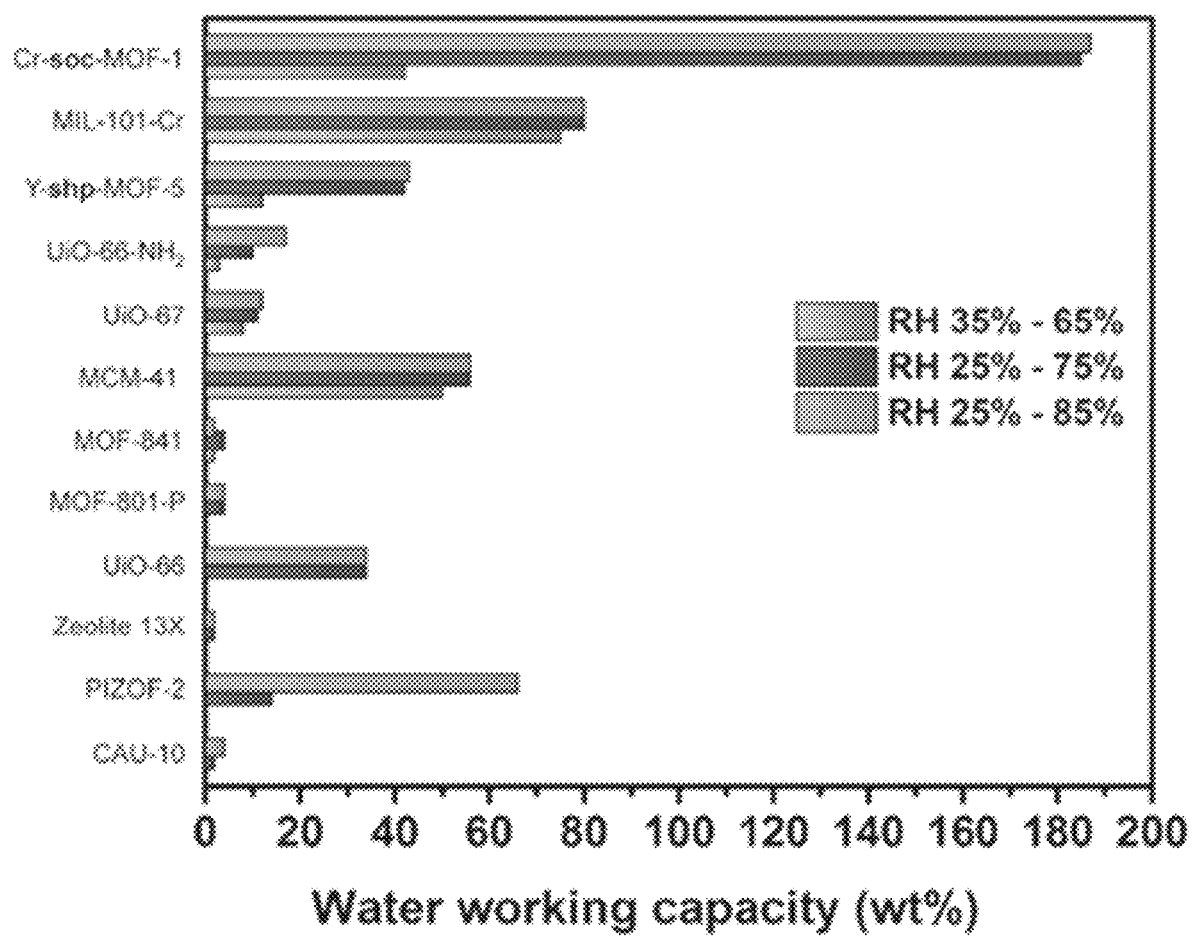
FIG. 3 shows examples of various exemplary candidate water adsorbent materials based on working capacities for various ranges of relative humidity (9RH)
Figure 4:
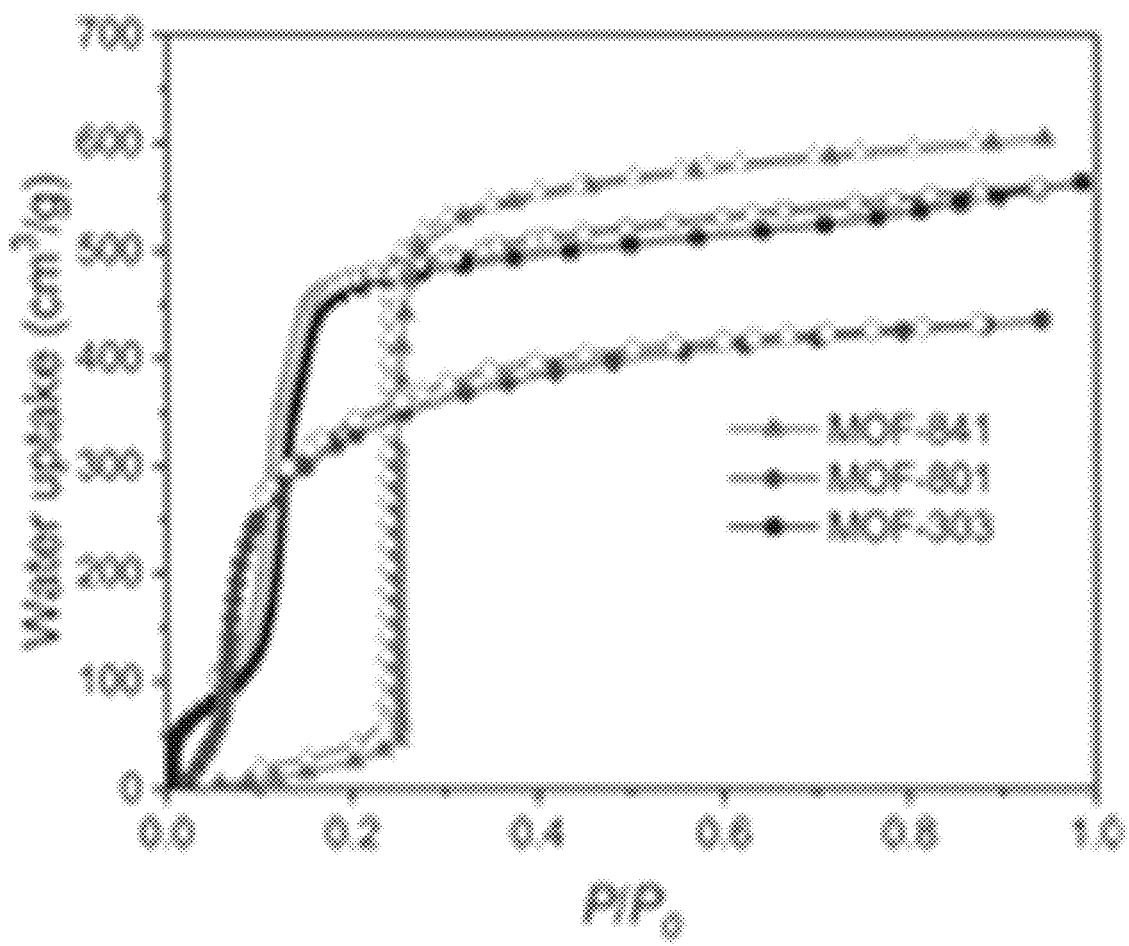
FIG. 4 shows the water sorption performance three exemplary MOFs (303, 841, and 801) at 25 C.
Figure 5:
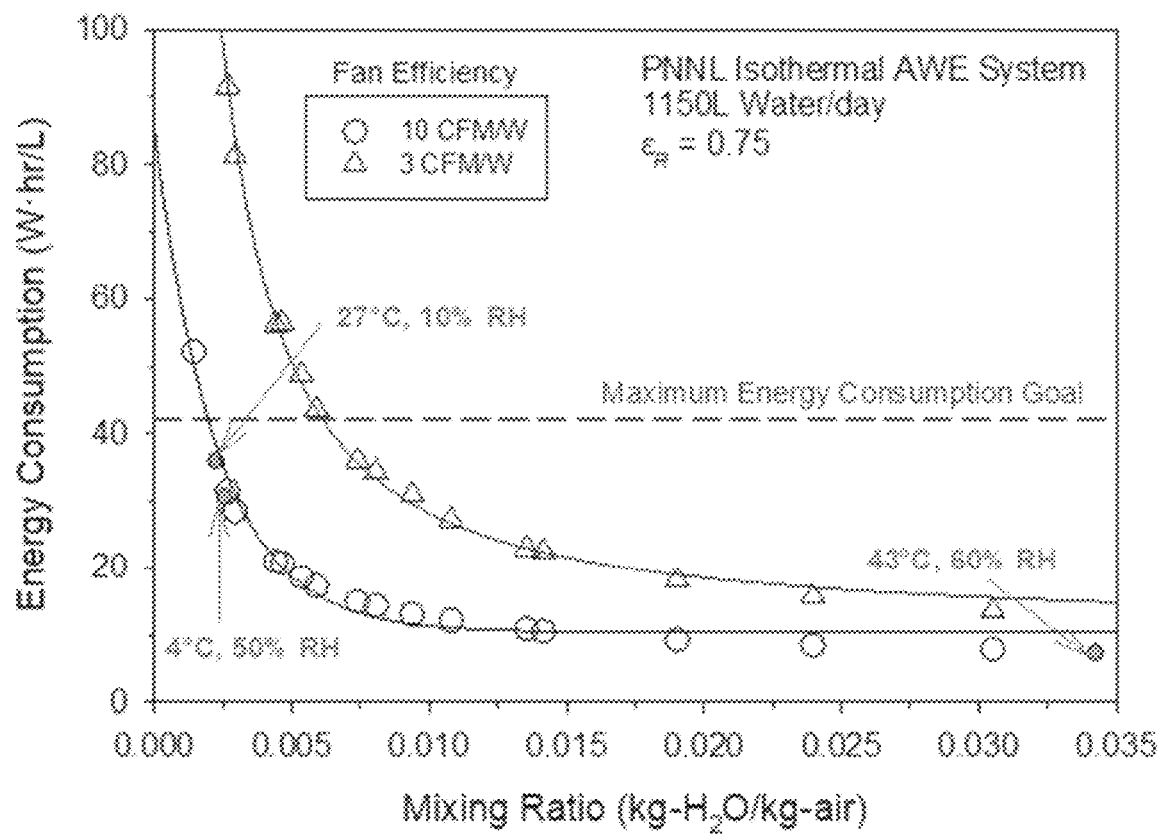
FIG. 5 shows the Volumetric Energy Consumption for the Isothermal AWE System for Two Fan Efficiencies.

For fan power, we use the data provided in Clarke and Ward (2006) for fan efficiency in typical ventilation systems as shown in FIG. 2. As would be expected, the fan efficiency declines as back pressure increases. This provides an important constraint on the design of the desiccant bed. Excessive pressure drop and hence high-power consumption would result from attempting to pass the air stream through a bed of finely packed desiccant particles. To avoid that, our system design concept passes the air stream through channels between fins, similar to radiator designs, and so can provide minimal back pressure on the fan. For analysis purposes here, we used two fan efficiency values, 10 and 3 CFM/W to complete the energy consumption calculation for our AWE system.

With the simple assumptions outlined above, the energy consumption for our design falls along a single curve determined by the mixing ratio of the ambient air stream. Fan power consumes about 80% of the total energy budget. The results provide confidence that our AWE system can achieve a target of 42 W·hr/L if the system design provides a low back pressure on the fan. Sorbents optimized for a 43° C., 60% RH condition are likely to perform poorly and result in much higher power consumption at the more challenging 27° C., 10% RH humidity condition and vice versa.

Figure 8:
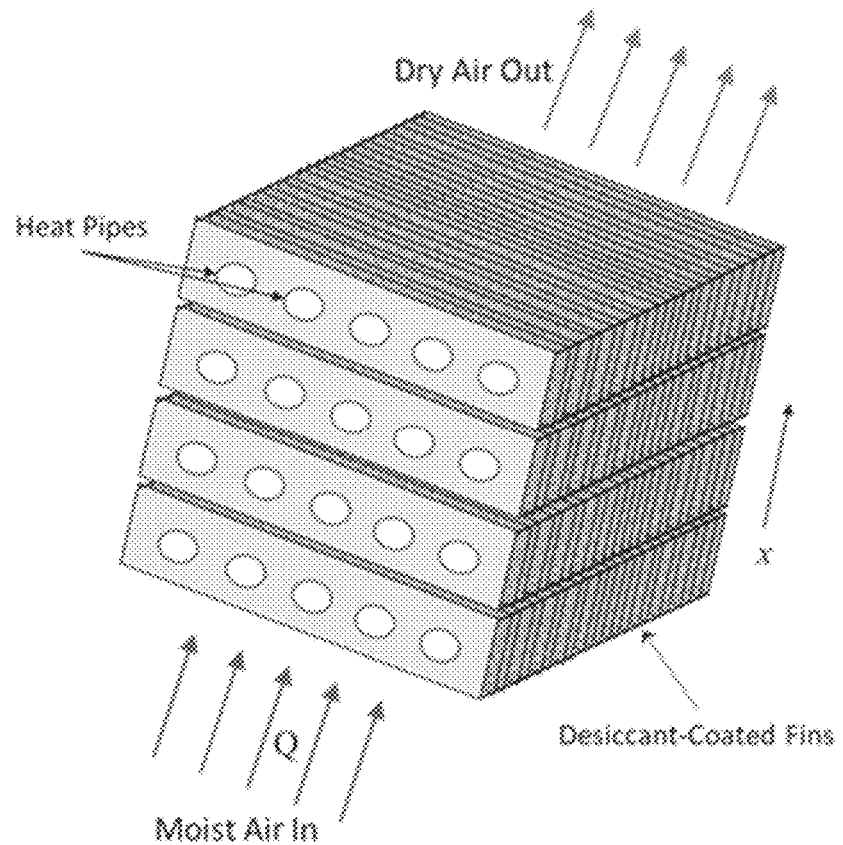
FIG. 8 shows another embodiment of the present invention wherein desiccant is coated on fins made of graphene or other lightweight but thermally conductive support.

FIG. 8 shows an example of a modified heat pipe radiator design desiccant bed system formed similarly to a radiator with a set of thermally conductive fins made of a very lightweight material like graphene coated with desiccant. As air flow through the channels between the fins heat pipes remove heat from each adsorbing bed for transfer to the other chamber with an identical set of beds undergoing regeneration. A heat transfer simulation of this design using the computational fluid dynamics (CFD) code ANSYS-Fluent confirmed that only a 5° C. maximum temperature rise in the adsorbing bed for the 43° C., 60% RH case that has the lowest air flow rate (1000 CFM). This confirms our design premise in being able to thermally couple the adsorption-desorption chambers and operate the AWE system approximately isothermally.

This technology is a significant improvement over today's vapor-compression cooling systems and delivers humidity management in conditioned building spaces with zero energy penalty. In addition, the simple design is amenable to both new build HVAC systems and retrofit installations. Based on expected capacity of advanced desiccants, size of the dehumidifier system for our 50 RT reference case is projected at just over 30 ft$^3$. This can be compared with a commercial building dehumidifier system for this same size air flow (17,000 cfm) of 200 ft$^3$. Hence, the system envisioned here can be integrated in standard HVAC air handler units that is not possible with current dehumidifier systems. Last, we point out that the desiccant system is amenable to addition of other sorbent materials for selective removal of pollutants (such as $CO_2$ or VOCs), which could enhance customer appeal beyond energy and cost savings alone.

Figure 9:
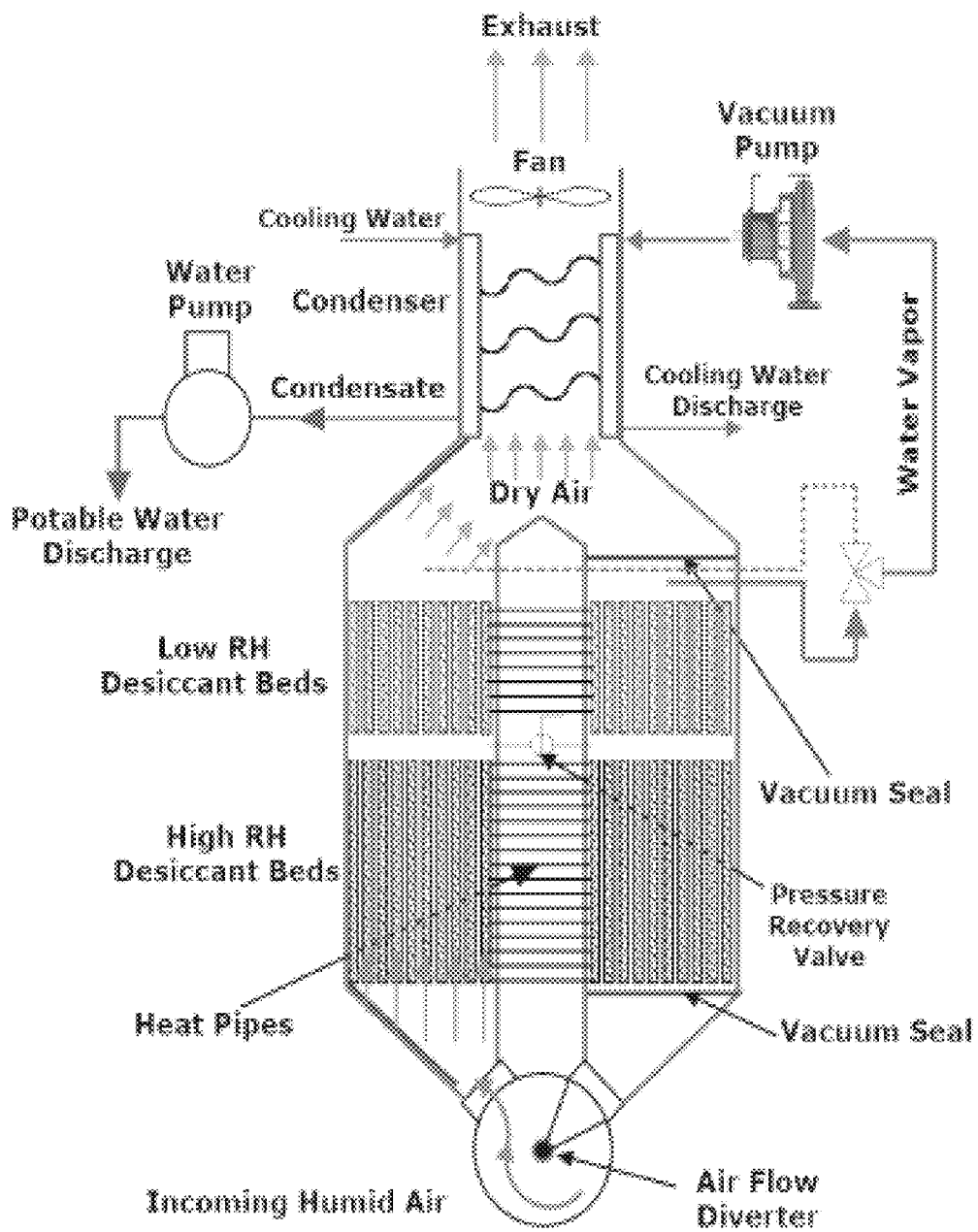
FIG. 9 shows an example of a second schematic example of the present invention.

A second schematic design is shown in FIG. 9. In FIG. 9 the heat of adsorption from the active bed to the regenerating bed is provided through a design that utilizes heat pipes. The benefit is a passive heat transfer process that yields an isothermal condition during bed adsorption/regeneration. Moreover, the exterior surfaces of the heat pipes provide a natural support for the desiccant materials to be deposited. In addition to the desiccant bed design, ducting can necessary diversion of air flow and vacuum isolation around each bed during regeneration. In the arrangement shown in FIG. 9, the two desiccant sections are expected to be fabricated using cylindrical ducting with ¼-inch diameter heat pipes placed in the crossflow. Each heat pipe will be coated with a layer of sorbent around its periphery with the optimum sorbent layer thickness. A staggered installation pattern along the direction of flow will maximize airflow exposure to the desiccant and promote more turbulence and mixing yielding higher heat and mass transfer coefficients. Bed sections will be assembled with vacuum-rated airflow isolation valves with autonomous diversion control to either the air discharge or the vacuum pump. The system will be fully instrumented with thermocouples, pressure transducers, Coriolis flow meters and RH sensors to monitor key parameters and variables. Water concentrations in the ambient air stream will be controlled by a mixing valve that merges a dry air stream with variable amounts of a 100% RH air stream to achieve a specific humidity. Relative humidity sensors (Omega Engineering, Inc., model RH-USB) are placed at the desiccant bed inlet and outlet to continuously monitor RH values. This simple test system will allow us to collect all the required performance information on the desiccant bed system to assess performance and perform thousands of regeneration cycles to look for any degradation in desiccant properties.

While various preferred embodiments of the disclosure are shown and described, it is to be distinctly understood that this disclosure is not limited thereto but may be variously embodied to practice within the scope of the following claims.

What is claimed is:

1. A humidity management system comprising:
an air stream inlet;
a desiccant bed positioned downstream from the air stream inlet, and comprising a regenerable nanostructured desiccant porous material configured to adsorb water from an air stream at a first pressure and to release water when subjected to a second pressure, wherein the second pressure is lower than the first pressure, wherein the regenerable nanostructured desiccant porous material comprises one or more material selected from metal organic framework material, zeolite, mesoporous silica, covalent organic framework material; porous organic polymer; or porous carbon;
a vacuum pump that is in communication with the regenerable nanostructured desiccant porous material; and
an evaporator positioned downstream from the desiccant bed.

2. The system of claim 1, wherein the system further comprises a compressor, a condenser, and an expansion valve configured to circulate a coolant through the evaporator.

3. The system of claim 1, wherein the regenerable nanostructured desiccant porous material comprises a metal organic framework material.

4. The system of claim 2, wherein the regenerable nanostructured desiccant porous material comprises a metal organic framework material.

5. A heating, ventilation and air conditioning system comprising the humidity management system of claim 1, wherein the air stream inlet comprises an air handler.

6. A method for removing moisture from an air stream comprising:
passing an air stream over a regenerable nanostructured desiccant porous material configured to adsorb moisture from an air stream at a first pressure and to release moisture when subjected to a second pressure, wherein the second pressure is lower than the first pressure, resulting in an air flow with reduced moisture content; and
passing the reduced moisture content-air flow over evaporator coils, wherein the moisture in the reduced moisture content-air flow has been reduced sufficiently so that the reduced moisture content-air has a dewpoint that is below the temperature of the evaporator coils.

7. The method of claim 6, further comprising circulating a coolant through the evaporator coils.

8. The method of claim 6, wherein the regenerable nanostructured desiccant porous material comprises a metal organic framework material.

\* \* \* \* \*